United States Patent [19]

Sandow

[11] 4,081,111
[45] Mar. 28, 1978

[54] ADJUSTABLE VOLUME SETTING MECHANISM FOR REPEATABLE FLUID DISCHARGE DEVICE

[75] Inventor: Kiyoshi Sandow, Houston, Tex.

[73] Assignee: Plasteco, Inc.

[21] Appl. No.: 731,205

[22] Filed: Oct. 12, 1976

[51] Int. Cl.² .......................................... G01F 11/06
[52] U.S. Cl. ................................. 222/309; 222/321
[58] Field of Search ................................ 222/309, 321

[56] References Cited
U.S. PATENT DOCUMENTS

| 1,553,805 | 9/1925 | Eckert | 222/309 |
|---|---|---|---|
| 2,096,461 | 10/1937 | Mane et al. | 222/309 X |
| 3,118,568 | 1/1964 | Bishop et al. | 222/309 X |
| 3,556,353 | 1/1971 | Echols | 222/309 |

Primary Examiner—Robert B. Reeves
Assistant Examiner—H. Grant Skaggs
Attorney, Agent, or Firm—Pravel, Wilson & Gambrell

[57] ABSTRACT

A new and improved dispenser device and method for accurately dispensing selected volumes of fluid and for permitting repetitive dispensing of the fluid by the manipulation of a stroke-setting mechanism that selectively varies the amount of liquid pumped from the container by a pump, wherein the stroke-setting mechanism making the settings for dispensing the different volumes of liquid is manipulated from externally of the dispenser device and without the necessity of disassembly from the container with which it is used.

12 Claims, 5 Drawing Figures

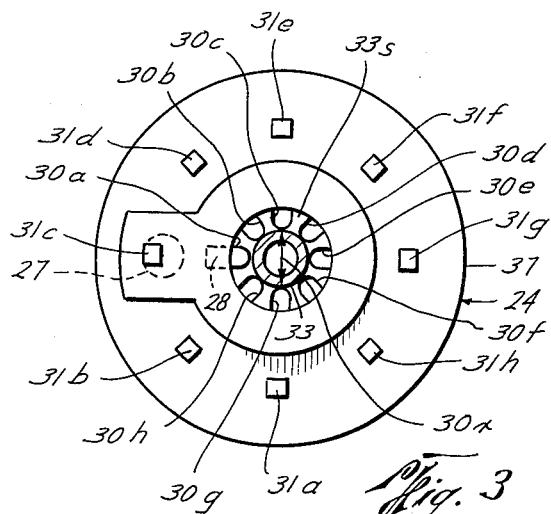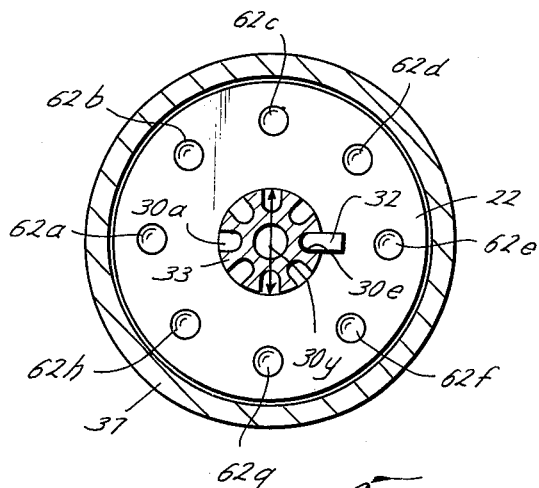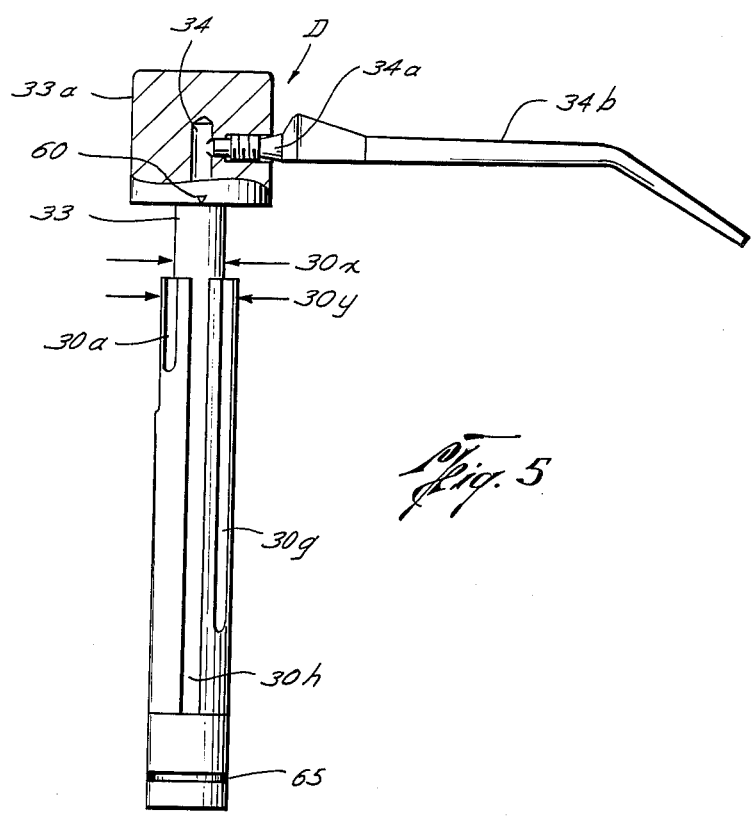

ADJUSTABLE VOLUME SETTING MECHANISM FOR REPEATABLE FLUID DISCHARGE DEVICE

BACKGROUND OF THE INVENTION

1. Field of the Invention

This invention relates generally to apparatus and methods for dispensing liquids; and, more particularly, to apparatus adapted to depend from a bottle cap and into liquid within the bottle to permit repetitive dispensing of measured quantities of liquid.

2. Description of the Prior Art

Dispensing devices are frequently used in scientific laboratories where measured quantities of chemical reagents or the like must be transferred from storage bottles to test tubes or other small receptacles. When caustic, highly acidic, or toxic chemicals are involved, the user must typically disassemble the device in order to change the amount to be dispensed. For instance, in Echols U.S. Pat. No. 3,556,353, the user must remove the dispensing apparatus and cap from the bottle. Also, if the solution in the bottle is dark, one cannot read the scale on the delivery tube unless the plunger is pulled out.

Other prior art of interest, but having other or similar disadvantages and problems, are U.S. Pat. Nos. 3,653,556; 3,458,090; 3,452,901; 3,283,727; 3,191,807; 3,101,751; 2,805,798; and B497,853 (Feb. 17, 1976 under Second Trial Voluntary Protest Program).

SUMMARY OF THE INVENTION

This invention relates to a new an improved dispenser device and method for dispensing predetermined amounts of fluid as selected by an operator and for permitting repetitive dispensing of the fluid, if desired, without disassembling the device for making the settings for dispensing different liquid volumes. The dispenser accomplishes a positive dispensing of each selected volume of liquid based upon the selected setting by the operator.

BRIEF DESCRIPTION OF THE DRAWINGS

The following description and the annexed drawings set forth in detail a certain illustrative embodiment of the invention, this being indicative, however, of but one of the ways in which the principle of the invention may be employed. The advantages and features of the present invention will be more apparent after a perusal of the following specification taken in connection with the accompanying drawings, wherein:

FIG. 3 is a horizontal sectional view taken on line 3—3 of FIG. 1, showing the relationship between the adjustable stroke-setting means, the plunger means, and parts thereof;

FIG. 4 is a horizontal sectional view taken on line 4—4 of FIG. 1, showing the relationship between an adjustable stroke-setting means, the plunger means, recesses in the cap structure to the bottle, and the bottle; and FIG. 5 is an enlarged side view of the plunger, partly in section, with delivery cap and delivery port taken on line 5—5 of FIG. 2.

DESCRIPTION OF THE PREFERRED EMBODIMENTS

Figure 1:
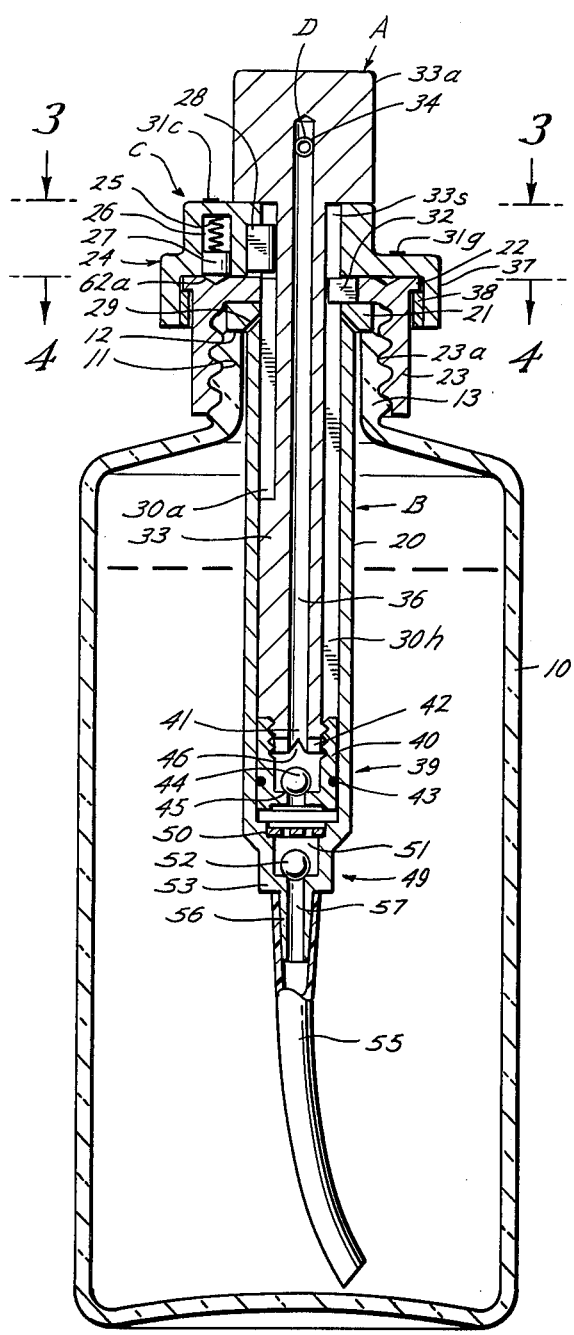
FIG. 1 is a side view, partly in section, showing the liquid dispensing device of this invention, with the plunger means thereof in a downward position.

Referring to the drawings, the letter A designates generally the dispenser device of this invention which includes a pump means in the form of a positive lift pump or a slidably mounted plunger dispenser means B, an adjustable stroke-setting means C, and a dispenser discharge outlet means D. The plunger dispenser means B has barrel means with plunger means which in the figures are a longitudinal cylindrical barrel 20 with a cylindrical plunger 33 longitudinally movable and slidably fitting therein, respectively. The barrel 20 is disposed in a container 10, such as a bottle or other vessel having fluid to be dispensed. The container 10 preferably has external threads 11, and an annular upper edge or shoulder 12 to support the barrel 20. Barrel 20 has two vents 29 which connect the interior of the barrel to the exterior of the barrel and expose the interior of the container 10 to the atmosphere. With non-corrosive liquids, or liquids without extremely high acidity or basicity, barrel 20 can be made from a plastic or a polypropylene material.

The barrel 20 has a corresponding annular flange 21 to rest on or fit with the annular shoulder 12 of the bottle. An outer cap structure means in the form of a cylindrical cap 23 has interior threads 23a which are threaded on threads 11 in a neck 13 of the bottle 10 to hold the flange 21 of the barrel 20 in seated position on the shoulder 12. Adjustable stroke-setting means C preferably takes the form of (1) a cylindrical rotatable turret 24 embracing the cap 23 by means of a cylindrical flange 37 and a bottom ring or peripheral flange 38 secured thereto by adhesive or other securing means, and (2) a stroke-setting means, as will be explained. The cylindrical flange 37 and peripheral flange 38 fit around outer flange 22 of the cap. The cap 23 is equipped with a recess 26 containing a coil spring 25 and an indexing pin 27. The plunger 33 has longitudinal axially-extending grooves 30a–30h of different lengths and of predetermined number which are about the periphery of the plunger. The number of the grooves 30a–30h (FIGS. 1, 3) may vary, depending on the number of different dispensing volumes desired. Position-locating beveled recesses 62a–62h (FIG. 4) are formed in the cap 23 and are disposed radially outwardly in one-to-one correspondence with the grooves 30a–30h, so as to provide a stop point for each of the grooves 30a–30h, as will be explained.

As shown in FIG. 3, when the turret 24 is revolved by hand with respect to the outer cap structure 23, the stop pin 27 falls into place in one of the beveled recesses 62a–62h corresponding to the particular groove 30a–30h in the plunger radially inwardly from such recess.

In FIG. 1, the longitudinal cylindrical plunger 33 with plunger cap 33a is prevented from rotating about its axis with respect to cap 23, container 10, and barrel 20, no matter whether the plunger 33 is in an upward or downward position, by means of a lock means or key 32 with the cap 23. The key 32 fits into an internal recess of cap 23 and projects radially into the longest groove 30h of plunger 30. Preferably, key 32 takes the form of a pin which is secured by adhesive or other securing means to outer cap 23. Hence, only the stroke-setting turret 24 is rotatable relative to the rest of the mechanism when assembled as in FIG. 1.

Figure 2:
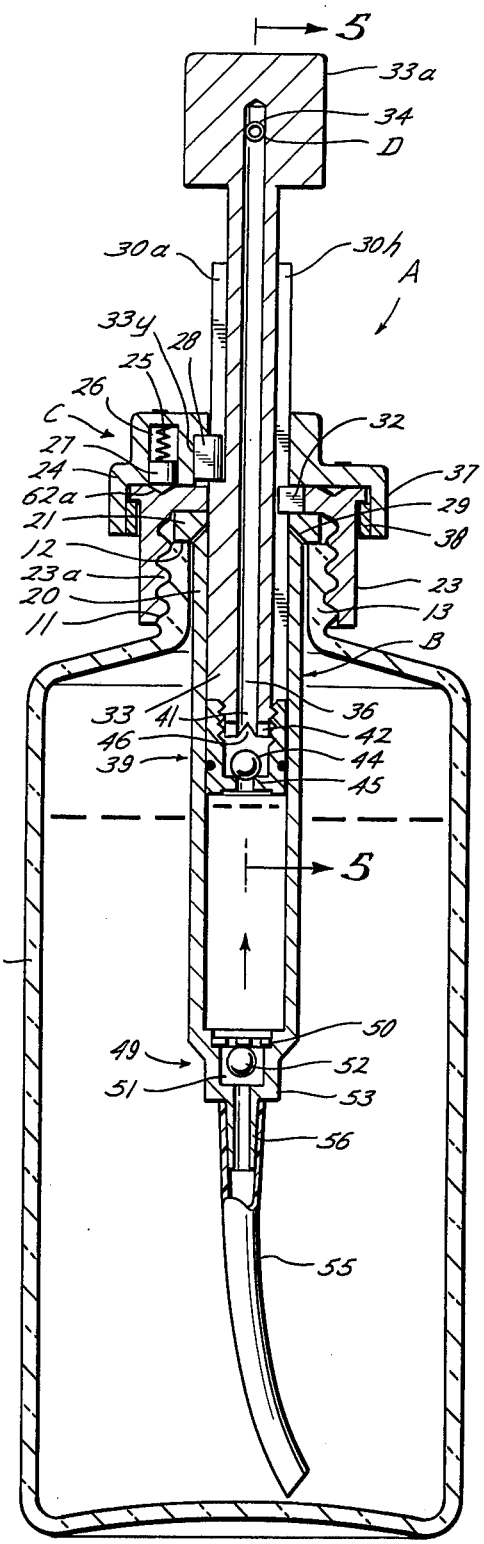
FIG. 2 is a view similar to FIG. 1, but illustrating the plunger means in an upward dispensing position.

As illustrated in FIG. 2, the plunger 33 with dispenser discharge outlet means D (described hereinafter) can be withdrawn from the barrel 20 until a stroke-setting means in the form of a guide means 28 in FIG. 2 rotating with the turret 24 engages the bottom of the groove selected. The guide means 28 is secured to the turret 24 by adhesive or other securing means and fits into an annular recess 33y on the interior of the turret 24 (FIG. 2). The guide means 28 is adapted to be vertically aligned with each of the grooves 30a–30h successively by rotating the turret 24 when the plunger 33 is in the downward position (FIG. 1), as the plunger 33 has a narrower upper diameter 30x (FIGS. 3, 5) near the dispenser discharge outlet means D than its wider lower diameter 30y (FIGS. 4, 5) in the grooved portion.

It is preferable to associate each and every groove 30a–30h of plunger 33 in one-to-one correspondence with volume-indicating mark 31a–30h located on the exterior of the turret 24 as shown in FIGS. 2 and 3. An index mark or arrow 60 (FIG. 5) is located on the plunger cap 33a so that when the turret 24 is rotated, the arrow 60 is successively aligned with each volume indicating mark 31a–31h associated with each groove 30a–30h. When the turret 24 is rotated, indexing pin 27 is urged into place by a spring 25 in one of the beveled recesses 62a–62h, each of which corresponds with one of the grooves 30a–30h.

As shown also in FIGS. 1 and 5, the interior of plunger 33 has a central bore or passageway 36 for the fluid to pass through the dispenser discharge outlet means D, which takes the form of a delivery port as delivery port assembly including delivery port 34 in the cap 33a, which port extends as a passageway to a discharge spout introduction passageway 34a and ultimately to discharge spout 34b (FIG. 5) which is threaded or otherwise connected to the plunger cap 33a.

At the bottom of the plunger 33 in FIG. 1, and a part thereof, is a first valve means or an upper ball valve assembly 39, which assembly prevents liquid from discharging undesirably from the delivery spout 34b when the plunger 33 is lifted. The ball valve assembly 39 is mounted in a piston 40. The passageway 36 extending through the plunger 33 has a protruding end 41 which is beveled 42 with notches 46 for fitting in a non-sealing engagement with spherical ball valve 44 to allow a liquid flow through passageway 36 to discharge spout 34b when the plunger is plunged downward. A piston ring 43 formed of rubber or the like is in an annular recess 65 (FIG. 5) of the plunger 33 which prevents the escape of liquid through the wall between plunger 33 and barrel 20 when the plunger is stroked downward. As shown in FIG. 1, the ball valve 44 operates in an upper ball valve cavity 46 between a valve seat 45 located at the bottom of upper ball valve assembly 39 and the beveled end 42 with notches 46 of passageway 36. When the plunger is raised upwards, ball valve 44 fits in sealing engagement with valve seat 45 to restrict liquid flow from passing through passageway 36 from the chamber 20.

Also in FIG. 1, the lower portion of the barrel has a second valve means or a lower ball valve assembly 49, which acts to allow fluid to enter the barrel chamber when the plunger is lifted (FIG. 2), but prevents liquid from escaping through a tube delivery means which takes the form in FIG. 1 as a flexible tube 55, as the plunger 33 is moved downwardly. Preferably, the lower ball valve assembly 49 contains a lower ball valve 52 in a lower ball valve cavity 51 restricted vertically between an upper position (FIG. 2) by a perforated washer 50 affixed to the lower end of the barrel which position allows liquid flow into the barrel 20, and a lower position (FIG. 1) by a lower ball valve seat 53 that fits in sealing engagement with lower ball valve 52 to prevent liquid flow into the chamber 20. When the plunger 33 is moved upward, lower ball valve 52 rests against washer 50, allowing the fluid to pass into the chamber 20. As the plunger is pushed downward, lower ball valve 52 fits in sealing engagement with seat 53. Preferably, the barrel is tapered to form a nozzle portion 56 having a hole 57 for receiving the flexible tube 55. The tube 55 then extends into the bottom of the liquid in the container 10 to be withdrawn therefrom.

Preferably, the guide means 28 in FIG. 1 is in the form of a wedge which is freely rotatable in the annular recess 33s (FIG. 1) since the plunger 33 is of reduced diameter 30x (FIG. 5). Grooves 30a–30h are preferably of equal depth, and lock means 32 and guide means 28 extend a distance slightly less than the depth of the grooves 30a–30h of the plunger. The plunger 33 has a reduced diameter 30x as seen in FIGS. 3 and 5 to provide the annular recess 33s. This allows turret 24 to revolve around plunger 33, outer cap 23 and barrel 20, which are fixed with respect to one another and to the bottle 10. Preferably, the plunger cap 33a has a larger diameter than that of the interior diameter of barrel 20 to abut the upper end of the turret 24 to serve as a downward limit on the travel of the plunger 33.

It is understood in this invention that the number of grooves previously designated 30a–30h can vary depending upon the number of volumes of fluid to be discharged. The number of marks 31 and recesses 62 will then vary accordingly.

OPERATION

Operating the dispenser device shown in FIG. 1, one first turns cap 23 with its interior threads 23a of the dispensing device A with respect to container 20 having its exterior threads 11 in the neck 13 in order to tighten the cap of the device A to the container 10. Container 10 is at least partially filled with the liquid to be dispensed.

A volume corresponding to that indicated on one of the volume indicating marks of 31a–31h in FIG. 3 is selected in order to predetermine the amount of liquid to be dispensed. The turret 24 is next rotated until the index mark 60 on the cap 23 with the longitudinal cylindrical plunger 33 is opposite that selected volume indicating mark of 31a–31h (FIG. 3), and so that the indexing pin 27 engages a beveled recess 62a–62h in the cap 23 (FIG. 4) which recess is in a one-to-one correspondence to (1) the particular mark 31a–31h above and (2) to the longitudinally axially extending groove 30a–30h, respectively, the latter of which determines the predetermined liquid to be dispensed.

One then raises upward with respect to container 10 and turret 24 the plunger 33 by means of plunger cap 33a with delivery port assembly 34, until the guide means 28 with turret 24 limits the upward travel distance of plunger 33 (FIG. 2), as the guide means extends into the selected groove 30a–30h, and the selected groove is of a predetermined distance less than the entire length of the plunger, and corresponds to the volume to be dispensed.

With the upward motion of the plunger 33 (FIG. 2), the liquid enters the barrel through a second valve means or lower ball valve assembly 49, but cannot escape through a passageway 36 in the plunger 33 because of a first valve means in upper ball valve assembly 39. The barrel then contains the amount of fluid to be dispensed as indicated on the selected mark 31a–31h.

Finally, the plunger 33 is depressed downward whereby the liquid is dispensed through passageway 31 from barrel 20 through port 34, discharge spout introduction passageway 34a and discharge spout 34b (FIG. 5), but cannot escape through lower ball valve assembly 49 into the container. If the operator desires to dispense a volume which is an integer number times the volume shown by a mark 31a–31h, he raises upwards and downward in successive fashion the plunger 33 the integer number times required.

To dispense a different volume than that initially dispensed, the turret 24 is rotated to a selected position opposite another of the indicating marks 31a–31h, and then the foregoing operation is repeated. Thus, it can be seen that the amounts dispensed can be selected at random and as desired without removing the apparatus from the container.

The foregoing disclosure and description of the invention are illustrative and explanatory thereof, and various changes in the size, shape and materials as well as in the details of the illustrated construction may be made without departing from the spirit of the invention.

I claim:

1. A fluid dispenser for dispensing selected predetermined volumes of fluid from a container, comprising:
   barrel means for disposition into the container for receipt of fluid therefrom;
   plunger means mounted in said barrel means and having a passageway therethrough for passage of fluid from said barrel upon movement of said plunger means with respect to the container;
   said plunger means having a plurality of grooves of varying lengths formed thereon;
   a cap for mounting said barrel means with the container, said cap having a plurality of position-locating recesses formed therein, said cap further having an opening formed therein for passage of said plunger means therethrough;
   indexing pin means for movement into selected ones of said recesses in said cap when aligned therewith;
   turret means mounted with said cap, said turret means having an opening therein for passage of said plunger means therethrough, said turret means further having said indexing pin means mounted therewith and being movable with respect to said cap to align said indexing pin means with selected ones of said position-locating recesses; and
   guide means mounted with said turret means adjacent said opening therein for engagement with a selected groove in said plunger means according to the position of said indexing pin means in a selected one of said recesses in said cap, for limiting the amount of movement thereof to permit passage of a predetermined amount of fluid therethrough for dispensing from the container.

2. The dispenser of claim 1, wherein the grooves of varying lengths are formed about the periphery of said plunger means.

3. The dispenser of claim 1, wherein said turret means is rotatable with respect to said cap means.

4. The dispenser of claim 1, wherein said recesses are formed on an upper surface of said cap, each at a position aligned with one of said grooves on said plunger means.

5. The dispenser of claim 1, further including:
   lock means for locking said plunger means against rotational movement with respect to said cap.

6. The dispenser of claim 1, wherein said indexing pin means is mounted in a recess in said turret means and further including:
   a spring urging said indexing pin means towards said recesses.

7. The dispenser of claim 1, wherein said plunger means has a reduced diameter along a portion thereof to form an annular recess thereabout for receiving said guide means to permit said turret means to be moved with respect to said cap means.

8. The dispenser of claim 1, further including:
   volume indicators formed on said turret means to indicate the volume of fluid dispensed by said grooves in said plunger means 9. The dispenser of claim 8, further including:
   tube delivery means mounted with said barrel.

10. The dispenser of claim 1, further including:
    valve means mounted in said barrel for allowing passage of fluid into said barrel from the container.

11. The dispenser of claim 1, further including:
    valve means mounted in said plunger means for restricting fluid flow through said passageway therein as fluid is received in said barrel from the container.

12. The dispenser of claim 11, wherein said valve means permits fluid flow through said passageway in said plunger means as said plunger means is moved with respect to the container.

* * * * *